US006892411B1

(12) United States Patent
Yoon et al.

(10) Patent No.: US 6,892,411 B1
(45) Date of Patent: May 17, 2005

(54) HOLD DOWN FOR DOCK LEVELER

(75) Inventors: Young Z. Yoon, Indianapolis, IN (US); Robert J. Chirico, Indianapolis, IN (US)

(73) Assignee: Genquip Corporation, Indianapolis, IN (US)

(*) Notice: Subject to any disclaimer, the term of this patent is extended or adjusted under 35 U.S.C. 154(b) by 44 days.

(21) Appl. No.: 10/894,817

(22) Filed: Jul. 20, 2004

(51) Int. Cl.[7] .................................................. E01D 1/00
(52) U.S. Cl. ........................................ 14/71.3; 14/69.5
(58) Field of Search ............................... 14/69.5, 71.1, 14/71.3, 71.5, 71.7

(56) References Cited

U.S. PATENT DOCUMENTS

| | | |
|---|---|---|
| 3,117,332 A | 1/1964 | Kelley et al. |
| 3,137,017 A | 6/1964 | Pfleger et al. |
| 3,316,575 A | 5/1967 | Larsen et al. |
| 3,579,696 A | 5/1971 | Hecker, Jr. et al. |
| 3,699,601 A | 10/1972 | Hecker, Jr. et al. |
| 3,967,337 A | 7/1976 | Artzberger |
| 4,091,488 A * | 5/1978 | Artzberger .................. 14/71.7 |
| 4,126,909 A | 11/1978 | Smith et al. |
| 4,703,534 A | 11/1987 | Pedersen |
| 5,303,443 A | 4/1994 | Alexander |
| 5,774,920 A * | 7/1998 | Alexander .................. 14/71.3 |
| 6,061,859 A | 5/2000 | Winter |
| 6,125,491 A * | 10/2000 | Alexander .................. 14/69.5 |
| 6,481,038 B2 * | 11/2002 | Lounsbury et al. ......... 14/71.1 |

* cited by examiner

Primary Examiner—Robert E. Pezzuto
Assistant Examiner—Alexandra K. Pechhold
(74) Attorney, Agent, or Firm—Clifford W. Browning; Woodard, Emhardt, Moriarty, McNett & Henry LLP

(57) ABSTRACT

A pit dock leveler having a base frame secured to a loading dock pit and a dock platform pivotally connected at one of its ends to the base frame and pivotally connected at its opposite end to a dock platform lip that pivots between a downward hanging position when the dock leveler is not in use and an extended position substantially co-planar with the dock platform when the dock leveler is in use, whereby the dock platform lip spans and compensates for the space and height differentials between the loading dock and a transport vehicle, the dock leveler having a counterbalancing mechanism that pivots the dock platform upwardly and a hold down mechanism preventing the dock platform from pivoting upwardly; wherein the improved hold down mechanism includes a hold down bar pivotally connected at one end to the underside of the dock platform with its other end slideably received through a clasp and within a spring under compression against the clasp, the clasp and spring being mounted within a housing that is pivotally connected to the base frame; a clasp stop bar mounted within the housing on one side of the slide bar and against which the clasp is biased and pivoted by the compressed spring, whereby the clasp contacts the hold down bar at an angle thereby imparting a clamping force on the hold down bar that restricts movement of the hold down bar within the housing.

10 Claims, 6 Drawing Sheets

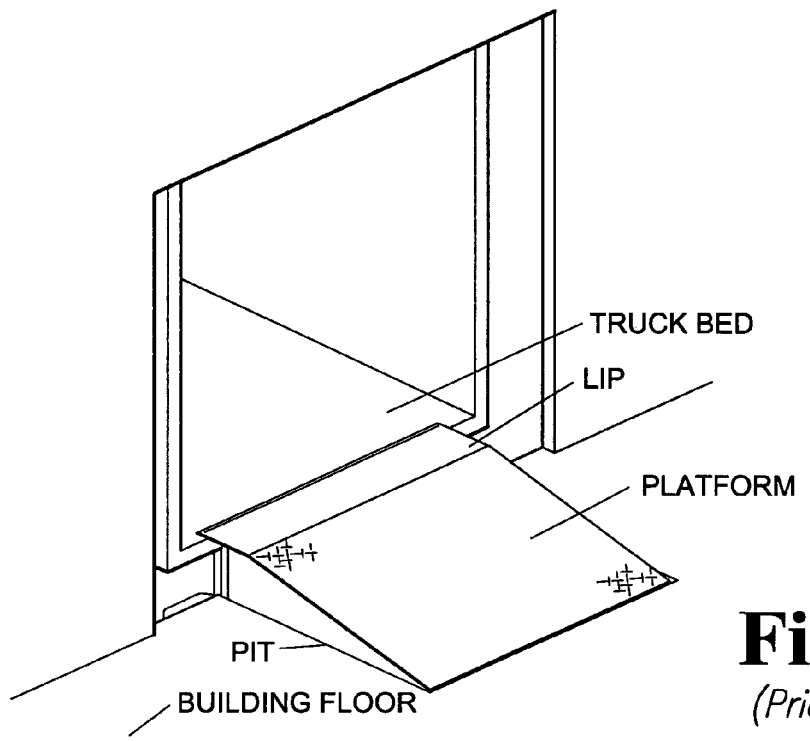
Fig. 1
*(Prior Art)*
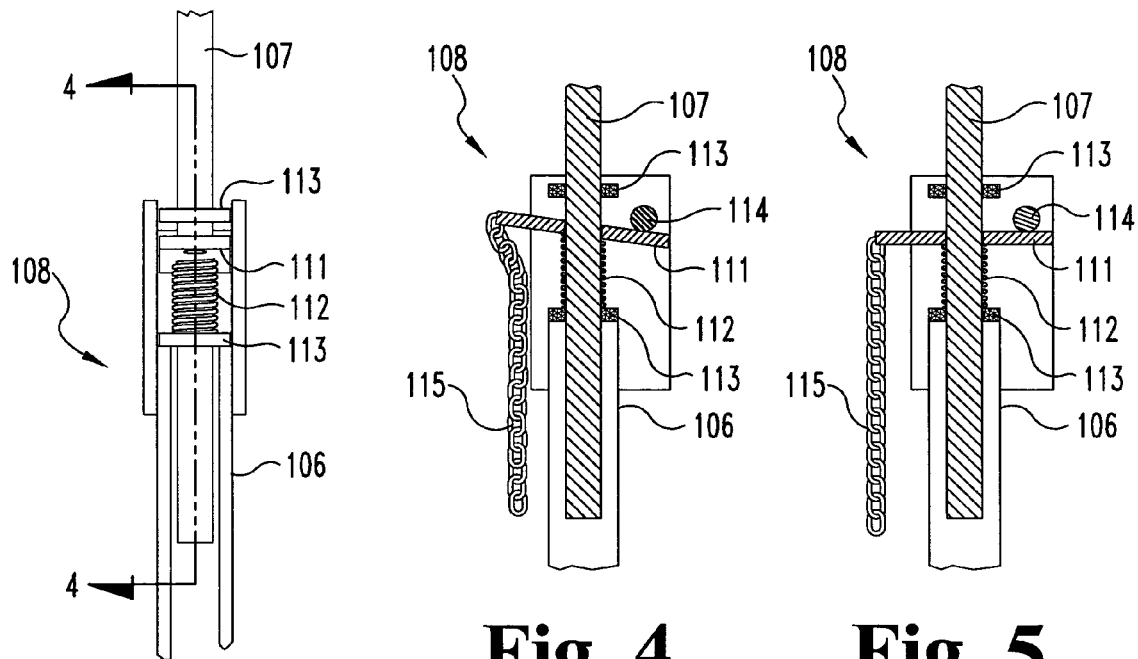
Fig. 3  Fig. 4  Fig. 5

HOLD DOWN FOR DOCK LEVELER

BACKGROUND OF INVENTION

A dock leveler (dockboard) is a device designed to bridge the gap between a loading dock and the top surface of a truck or trailer bed. Because the truck bed and the top of the loading dock are often not at the same height, most dock levelers can accommodate a range of vertical dock/truck bed mismatches.

Pit dock levelers reside in a pit formed in the dock and usually can accommodate a comparatively large dock/truck bed height mismatch, ±12 inches in most models. Pit dock levelers provide unobstructed access to the dock, but tend to cost more than other dock leveler types, both in initial cost and in the cost of concrete work for their installation within the dock.

Pit dock levelers come in many variations, but most existing pit levelers have a base frame that is secured to the dock pit and upon which other components of the leveler are attached, either directly or indirectly. Pivotally connected to the base frame is a dock platform capable of supporting a substantial load (i.e., fork truck traffic). Pivotally connected to the other end of the platform is a dock platform lip that hangs substantially downwards when not in use and is extended when in use to rest on a truck bed, creating a bridge between the dock and the truck.

The weight of the dock platform/lip combination is not trivial, and if the movements of the platform and lip are not motorized by either hydraulics, screw drives, pneumatics, or the like, then a counterbalancing method using springs is used. In most cases, the counterbalancing mechanism is upwardly biased, and the counterbalancing moment is slightly more than the moment required to rotate the platform upwards, thus rotating the platform upwards if left unrestrained. Preventing the platform from rotating upwardly is a hold down mechanism.

Typical operation of mechanical upwardly-biased levelers involves pulling a cable or chain to release the hold down mechanism thereby allowing the counterbalance mechanism to rotate the platform upwardly. Towards the top of the platform's upward travel, a chain or cable connected to a mechanism extends the dock platform lip (rotates it away from the platform) in some levelers. In other levelers, the dock platform lip extends when an operator walks down the dock platform when it has reached the top of its upward travel. In either case, an operator releases the cable or chain, re-engaging the hold down. The operator then walks down the platform causing the extended dock platform lip to rest upon the truck bed. The hold down works to allow easy downwards movement of the platform while restricting upward movement of the platform until the operator pulls the releasing cable or chain.

PRIOR ART

Over the years, several different types of dock leveler hold down mechanisms have been devised. The most commonly used is the linear ratchet and pawl as described, in various forms, in U.S. Pat. Nos. 6,061,859, 3,967,337, 3,699,601, 3,579,696, 3,137,017, and 3,117,332. All linear ratchet and pawl hold downs have similar construction in which a ratchet bar telescopes inside a housing. The end of the ratchet bar is attached to either the bottom of the deck of the leveler or to the leveler base frame. Enclosed within the housing is a pawl that engages the ratchet preventing movement of the deck. The ratchet is released via linkages and a manually tensioned chain. Connected to the housing is a compression spring that allows the hold down to give when the springs on the truck bed cause the truck bed to push up on the bottom of the lip and deck. The end of the spring is connected to either the platform or the base frame through mounting brackets opposite to the ratchet.

Circular ratchet-pawl mechanisms have also been utilized, such as those described in U.S. Pat. No. 4,703,534, which uses an extension spring to allow the mechanism to give under truck spring induced forces and U.S. Pat. No. 4,126,909, which uses a torsion spring to allow the mechanism to give under truck spring induced forces.

Another circular drum setup is illustrated in U.S. Pat. No. 3,316,575, which uses a friction joint in place of the ratchet and pawl, and an extension spring to allow the mechanism to give under the truck spring induced forces.

Friction brake linear hold downs have also been developed, as illustrated in U.S. Pat. No. 5,303,443.

All of these prior art hold down mechanisms have a distinct disadvantage in that some type of spring is utilized to allow the mechanism to "give" when the truck springs lift the platform up. If the newer, air cushioned trucks are utilized, the upwards travel on the platform can bottom out the spring (in the compression spring case) or over extend the spring (in the extension spring case) and jam the system, or break parts.

The ratchet and pawl mechanisms are also costly. The ratchet, in particular, is a highly machined, expensive part when compared to the machining practices typical in the industry: shearing, punching, welding, bending, and drilling. The ratchet and pawl are also subject to wear, require adequate lubrication, and are easily damaged if the spring (in the more common compression spring setup) bottoms out.

SUMMARY OF INVENTION

One preferred embodiment of the present invention is a pit dock leveler having a base frame secured to a loading dock pit and a dock platform pivotally connected at one of its ends to the base frame and pivotally connected at its opposite end to a dock platform lip that pivots between a downward hanging position when the dock leveler is not in use and an extended position substantially co-planar with the dock platform when the dock leveler is in use, whereby the dock platform lip spans and compensates for the space and height differentials between the loading dock and a transport vehicle, the dock leveler having a counterbalancing mechanism that pivots the dock platform upwardly and a hold down mechanism preventing the dock platform from pivoting upwardly; wherein the improved hold down mechanism comprises a slide bar pivotally connected at one end to the underside of the dock platform with its other end slideably received through a clasp and within a spring under compression against the clasp, the clasp and spring being mounted within a housing that is pivotally connected to the base frame; a clasp stop bar mounted within the housing on one side of the slide bar and against which the clasp is biased and pivoted by the compressed spring, whereby the clasp contacts the slide bar at an angle thereby imparting a clamping force on the slide bar that restricts movement of the slide bar within the housing.

Another embodiment of the present invention is a pit dock leveler having a pit dock leveler having a base frame secured to a loading dock pit and a dock platform pivotally connected at one of its ends to the base frame and pivotally connected at its opposite end to a dock platform lip that pivots between a downward hanging position when the dock leveler is not in use and an extended position substantially co-planar with the dock platform when the dock leveler is in use, whereby the dock platform lip spans and compensates for the space and height differentials between the loading dock and a transport vehicle, the dock leveler having a counterbalancing mechanism that pivots the dock platform upwardly and a hold down mechanism preventing the dock platform from pivoting upwardly; wherein the improved hold down mechanism comprises, a hold down bar pivotally connected at one end to the underside of the dock platform with its other end slideably received through a clasp assembly, and between clasping bars mounted therein; the clasp assembly being mounted within a clasp housing that is pivotally connected to the base frame; a control link pivotally mounted between the housing and the clasp assembly to hold the clasping bars in correct orientation, and a release arm pivotally mounted to the clasp assembly of sufficient length that by its weight it pivots the clasp assembly about its pivotal mount to the control link, whereby the clasping bars contact the hold down bar at an angle that imparts a clamping force on the hold down bar that restricts movement of the hold down bar within the housing.

Another embodiment of the present invention is a pit dock leveler having a base frame secured to a loading dock pit and a dock platform pivotally connected at one of its ends to the base frame and pivotally connected at its opposite end to a dock platform lip that pivots between a downward hanging position when the dock leveler is not in use and an extended position substantially co-planar with the dock platform when the dock leveler is in use, whereby the dock platform lip spans and compensates for the space and height differentials between the loading dock and a transport vehicle, the dock leveler having a counterbalancing mechanism that pivots the dock platform upwardly and a hold down mechanism preventing the dock platform from pivoting upwardly; wherein the improved hold down mechanism comprises, a hold down bar pivotally connected at one end to the underside of the dock platform with its other end slideably received through a clasp assembly, and between clasping bars mounted therein, mounted within a clasp housing that is pivotally connected to the base frame; a control arm pivotally mounted between the housing and the clasp assembly, with a spring under compression surrounding the control arm between the housing and the clasp assembly, to hold the clasping bars in correct orientation and to bias the clasp assembly away from the control arm, and a release arm pivotally mounted to the clasp assembly of sufficient length that by its weight it pivots the clasp assembly about its pivotal mounting to the control arm, whereby the clasp bars contact the hold down bar at an angle that imparts a clamping force on the hold down bar and restricts movement of the hold down bar within the housing until the clasp assembly pivots about it pivotal mounting to the control arm into contact with the housing and pivots thereafter about this point of housing contact until the control arm spring counters the point of contact pivotal movement and pivots the clasp assembly and the clasping bars into re-engagement with the hold down bar to restrict its movement within the housing.

The object of the present invention is to provide a dock leveler hold down device that does not require separate devices to allow upwards movement of the deck when a truck's springs lift the dock platform an undue amount.

It is another object to have a hold down mechanism that requires no adjustment for the life of the unit.

It is another object to minimize hold down mechanism cost by utilizing easily manufactured parts in common use within the industry. Such manufacturing processes include welding, saw cutting, punching, drilling, and slicing. Milling, shaping, turning, precision grinding, and broaching are processes not commonly used in the industry.

The improved hold down of the preferred embodiment of the present invention comprises a slide bar that is pivotally connected to the underside of the platform. The slide bar slides into a housing that is pivotally connected to the base frame. The connection points of the bar and housing may be reversed.

Placed over the slide bar and encapsulated within the housing is a spring and a clasp. The spring, under compression, pushes the clasp over the bar until one side of the clasp contacts a stop bar that is integral with the housing. The spring rotates the clasp around the stop bar until the hole in the clasp contacts the bar at an angle that imparts a clamping force on the bar, restricting movement of the slide bar in relation to the housing.

The clasp is designed such that at an upwards force on the deck (usually in the vicinity of 500 pounds) will overcome the clamping force provided by the clasp, and the clasp will slip, eliminating the necessity of the "give" spring used in earlier hold down mechanisms.

The clasp is manually released via a chain, cable, linkage or combination thereof attached to one end of the clasp. Pulling the release mechanism rotates the clasp and compresses the spring, releasing the clamping force on the slider bar and allowing movement of the slider bar both into and away from the housing.

The present invention will now be described with reference to the drawings, which illustrate the preferred embodiments of the invention to date.

BRIEF DESCRIPTION OF THE DRAWINGS

FIG. 1 illustrates a pit leveler with extended lip resting on a truck bed.

FIG. 3 is a top view of the hold down mechanism.

FIG. 4 is a section view of the hold down mechanism of FIG. 3 in clamping mode taken along line 4—4.

FIG. 5 is a section view of the hold down mechanism of FIG. 3 in released mode taken along line 4—4.

DETAILED DESCRIPTION OF THE PREFERRED EMBODIMENT

Figure 2:
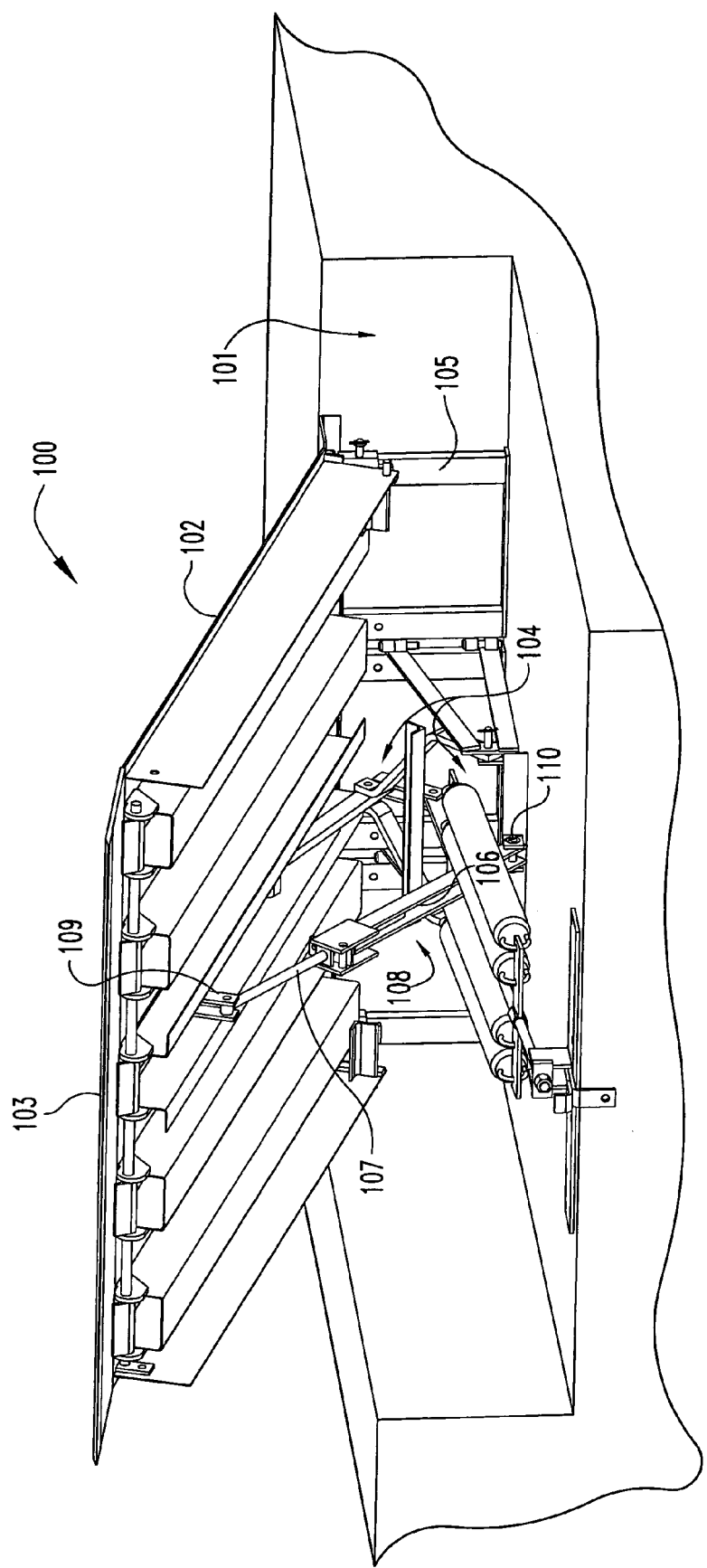
FIG. 2 is a perspective bottom view of a dock leveler with the hold down of the present invention illustrated in its preferred location.

Referring to the figures, the preferred embodiment of the invention will now be described. A pit dock leveler 100 is installed into the dock pit 101 via a base frame 105 securely fastened to the pit 101. Pivotally connected to the base frame 105 is a dock platform 102 that is capable of supporting a substantial load. A lip 103 is pivotally connected to the opposite end of the platform 102.

Connected to the underside of the dock platform 102, the base frame 105 and the pit 101 is spring counterbalance mechanisms 104 the purpose of which is to rotate (raise) the platform 102 and lip 103 around the pivot between the dock platform 102 and base frame 105. Many different types of counterbalancing mechanisms exist. For this description, only the purpose of the counterbalancing mechanisms need to be understood.

The counterbalance mechanisms 104 impart a moment load onto the bottom of the platform 102 that is slightly higher than the moment of the weight of platform 102 and lip 103 in combination. Thus, when not constrained by the hold down 108, the dock platform 102 and lip 103 combination will rise under the influence of counterbalance mechanisms 104.

Connected to the base frame 105 at a pivot joint 110 is a hold down housing 106. Sliding longitudinally into the opposite end of the hold down housing 106 is a hold down bar 107. The bar 107 is radially held in place via plates 113, which are located fore and aft of the clasp 111 and spring 112. The bar 109 is connected to the underside of the platform 102 through a pivot 109.

Between the plates 113 is a clasp plate 111. The bar 107 runs through a hole in the clasp plate 111. Integral to the housing 106 is a stop bar 114 that the clasp plate 111 is held tangent and against by a spring 112 that runs over the bar 107. Connected to the clasp plate 111 opposite stop bar 114 is a chain 115.

When the chain 115 is lax, the spring 112 rotates the clasp plate 111 around the stop bar 114 until the corners of the hole within clasp plate 111 "bite" into the hold down bar 107. Attempting to pull the hold down bar 107 away from the housing 106 results in a greater clamping force produced by the "bite," preventing the dock platform 102 and dock platform lip 103 combination from rising due to the spring counterbalance mechanisms' moment. When the chain 115 is pulled taught, the spring 112 is compressed when the clasp plate 111 rotates around the stop bar 114, and the clamping force is released, allowing the dock platform 102 and dock platform lip 103 combination to rise due to the spring counterbalance mechanisms' moment.

At some force level applied to pull the bar 107 and housing 106 apart, the pulling force will exceed the available clamping force provided by the "bite" of the clasp plate 111 on the bar 107, and the bar will slip within the hole of clasp plate 111. The desired slipping force is controlled via the spring force, material types, thicknesses and/or sizes, and by the diameter of the hole in the clasp plate 111.

Thus, when a truck's springs impart an undue load to the underside of the lip 103, thus exerting a pulling force on the bar 107, the bar 107 will slip past the clasp plate 111 and relieve the pulling stress. This controlled slippage of the bar 107 negates the requirement for any type of secondary release mechanism and also the requirement for any adjustments.

Except for the spring 112, the components described in the hold down mechanism 108 have no more precise machining requirements other than drilling operations for the hole in the clasp. Other components can be fabricated by saw cutting, punching, and/or slicing.

Figure 6A:
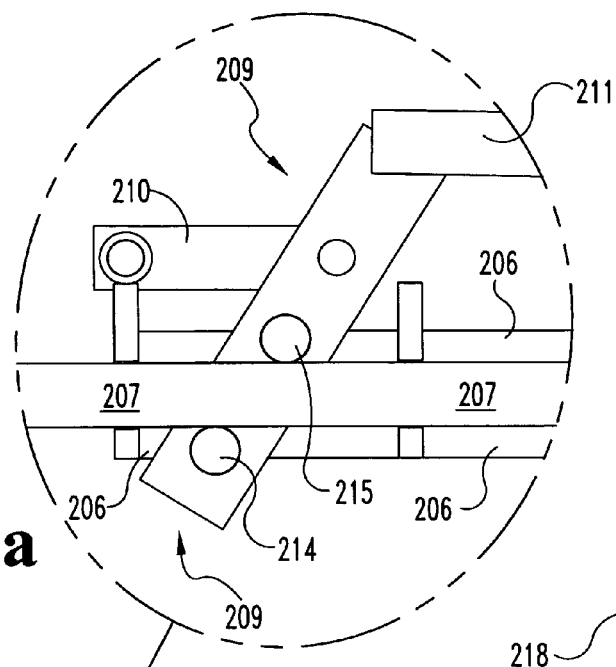
FIG. 6a is an enlarged partial view of FIG. 6.
Figure 6:
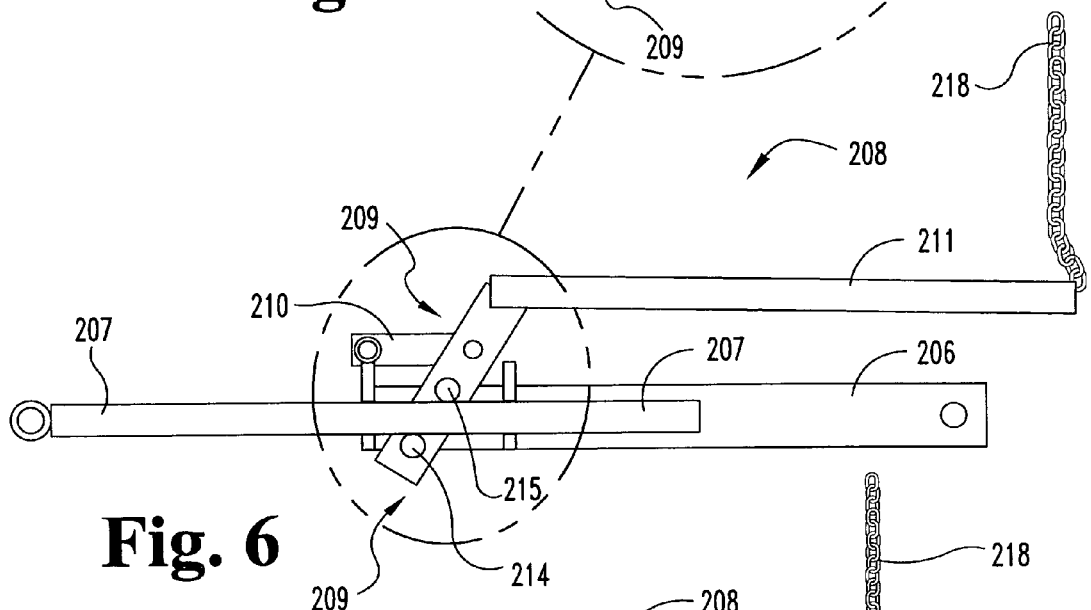
FIG. 6 is a side view of an alternative embodiment of the hold down of the present invention in clamping mode.
Figure 7:
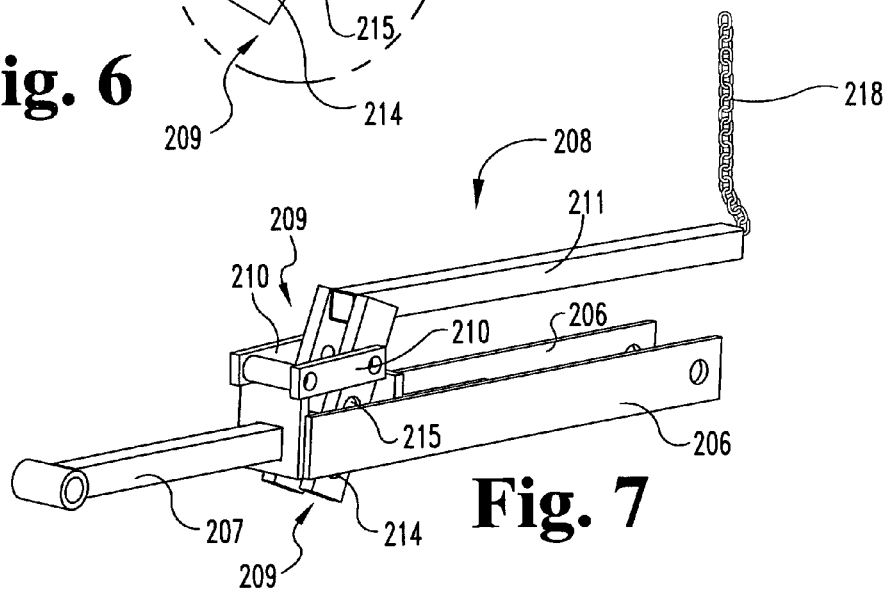
FIG. 7 is a perspective view of FIG. 6.
Figure 8A:
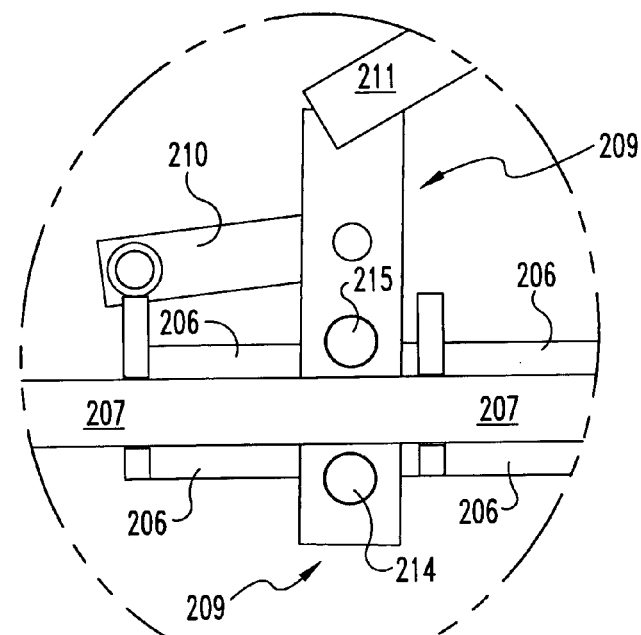
FIG. 8a is an enlarged partial view of FIG. 8.
Figure 8:
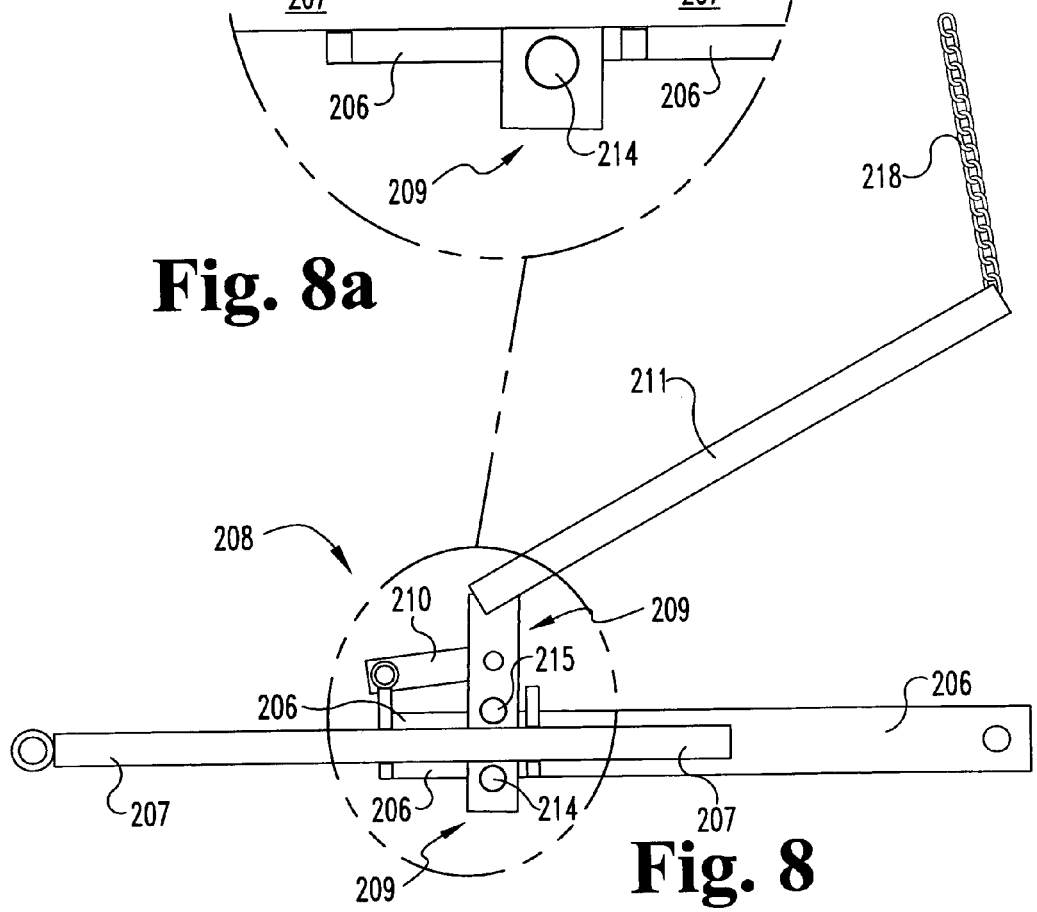
FIG. 8 is a side view of the hold down of FIG. 6 in released mode.

Referring to FIGS. 6 to 8a, this is an alternative preferred embodiment of the hold down 208 of the present invention. In this embodiment, the hold down bar 207 is a rectangular or square bar in place of the round bar previously described. A clasp assembly 209 replaces the clasp plate 111 and utilizes round clamping bars 214, 215 that clamp against the hold down bar 207 when the clasp assembly 209 is in a clamping mode (FIG. 6). Pivotally connected between the clasp assembly 209 and the clasp housing 206 are one or more control links 210 that maintain the correct orientation of the clasp assembly 209 to the hold down bar 207. A relatively long release arm 211 is fixed to the clasp assembly 209. The release arm 211 performs two functions. Its weight (under gravity) rotates and biases the clasp assembly 209 and clamping bars 214, 215 into the clamping mode (FIG. 6), therefore negating the necessity of a spring to hold the clasp assembly 209 in clamping mode (FIG. 6). It also increases the leverage available to release the clasp assembly 209 from the clamping mode (FIG. 6) by pulling on chain 218.

Figure 9:
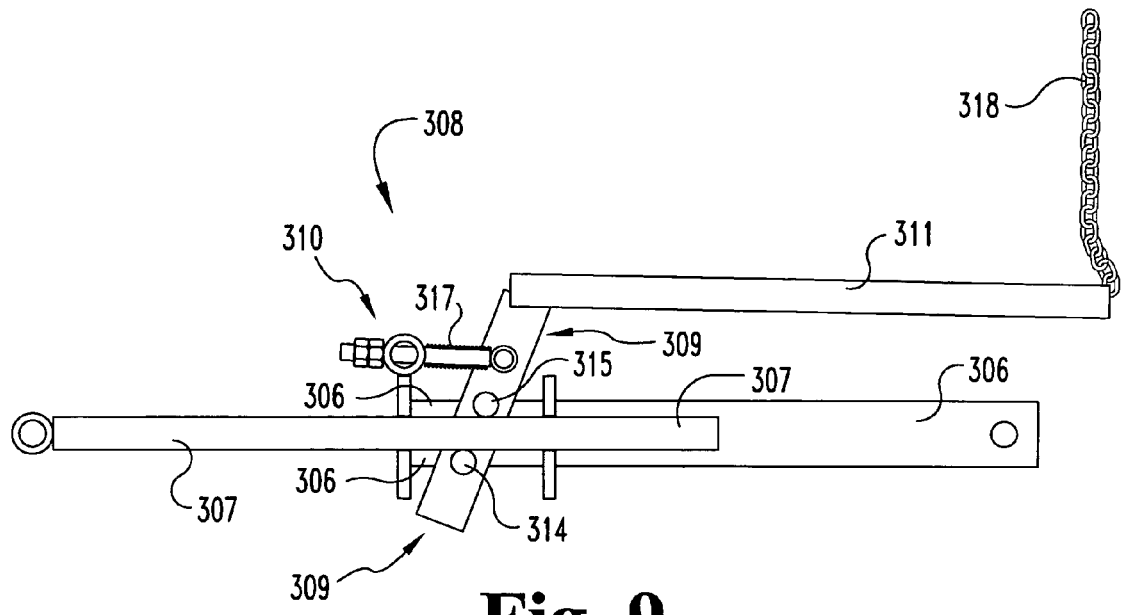
FIG. 9 is a side view of another alternative embodiment of the hold down of the present invention in clamping mode.
Figure 10:
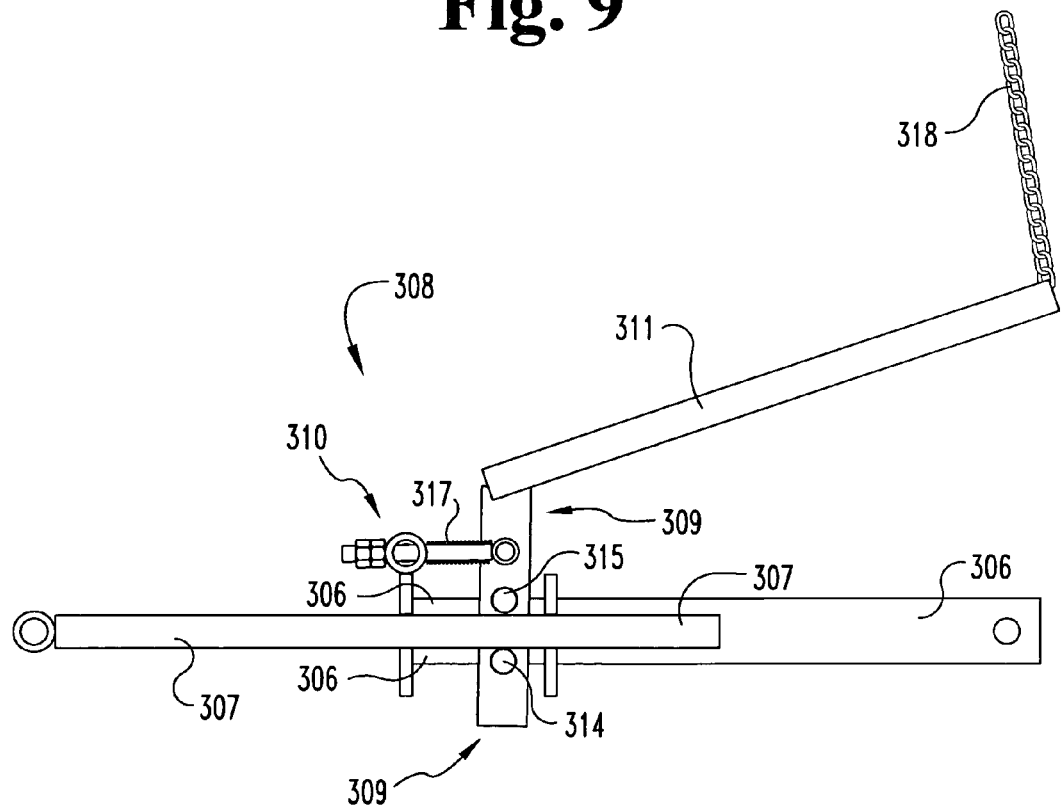
FIG. 10 is a side view of the hold down of FIG. 9 in released mode.
Figure 12A:
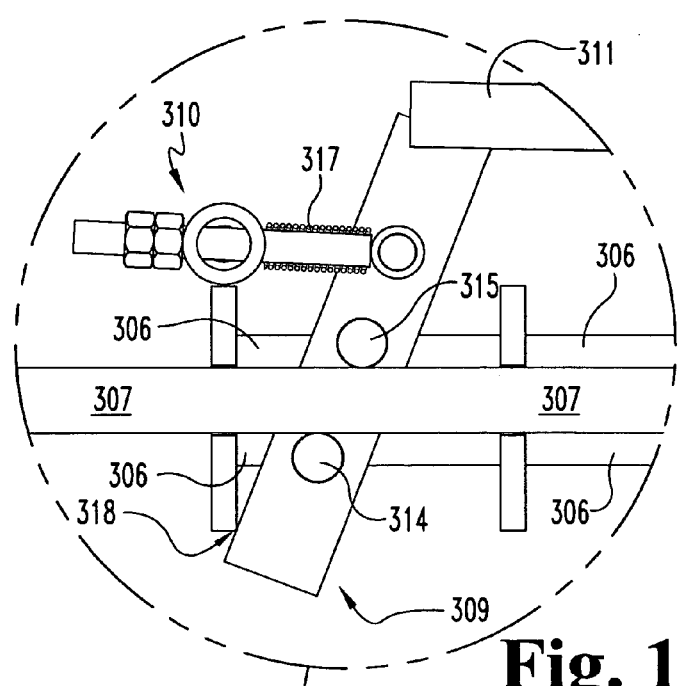
FIG. 12a is an enlarged partial view of FIG. 12.
Figure 12:
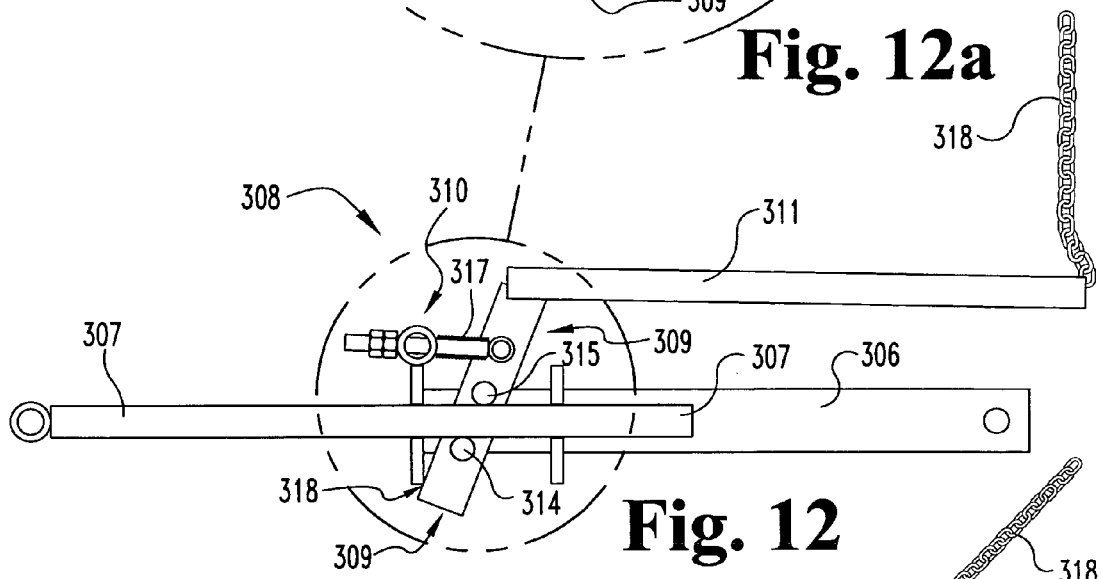
FIG. 12 is a side view of the hold down of FIG. 9 in the self releasing mode.
Figure 11:
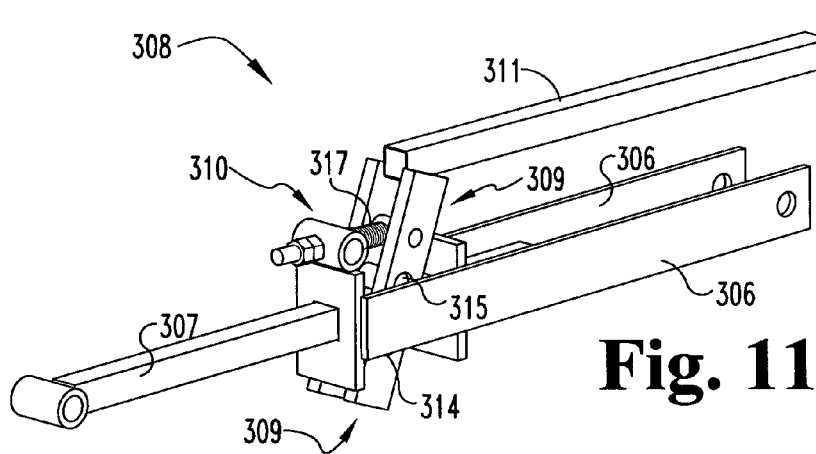
FIG. 11 is a perspective view of FIG. 9.

Referring to FIGS. 9 to 12a, this is a further variation of the alternative preferred embodiment of FIGS. 6 to 8a. In this alternative embodiment of the hold down 308 of the present invention, the hold down bar 307 is shown to be square but it can be round, oval, or rectangular in shape. The clasp assembly 309 utilizes round clamping bars 314, 315 that clamp against the hold down bar 307 when it is in clamping mode (FIG. 9). Pivotally connected between the clasp assembly 309 and the clasp housing 306 is a control arm assembly 310 with a spring 317 that maintains the correct orientation of the clasp assembly 309 to the hold down bar 307 and that spring 317 biases the control assembly 310 into a clamping mode (FIG. 9). Under normal circumstances, the spring 317 is highly, but not fully compressed. The relatively long release arm 311 is fixed to the clasp assembly 309. The release arm 311 performs two functions. Its weight (under gravity) rotates the clasp assembly 309 and round clamping bars into the clamping mode (FIG. 9) therefore negating the necessity of another spring to hold the clasp assembly 309 in clamping mode (FIG. 9). It also increases the leverage available to release the clasp assembly 309 when in the clamping mode (FIG. 9) by pulling on chain 318. Instead of the hold down bar 307 slipping through the clasp assembly 309 as in previous embodiments, this embodiment is actively self-releasing. When the hold down bar 307 is pulled out of the clasp housing 306 with a force that will further compress the spring 317, the clamping bars 314, 315 of clasp assembly 309 will move with the hold down bar 307 until the point at which that the clasp assembly 309 contacts the clasp housing 306. The clasp assembly 309, by contacting the clasp housing 306, will cause the clasp assembly 309 to rotate thereafter about the clasp housing 306 contact point 318, thereby releasing the clasp bar 307 from the clamping mode (FIG. 9) and allowing further movement of the hold down bar 307 out of the clasp housing 306 until such time as the spring 317 decompression force overcomes the rotation of the control assembly 309 caused by the movement there through of the hold down bar 307, and the clasp assembly 309 can be counter-rotated to re-engage the hold down bar 307 into clamping mode (FIG. 9).

We claim:

1. A pit dock leveler having a base frame secured to a loading dock pit and a dock platform pivotally connected at one of its ends to the base frame and pivotally connected at its opposite end to a dock platform lip that pivots between a downward hanging position when the dock leveler is not in use and an extended position substantially co-planar with the dock platform when the dock leveler is in use, whereby the dock platform lip spans and compensates for the space and height differentials between the loading dock and a transport vehicle, the dock leveler having a counterbalancing mechanism that pivots the dock platform upwardly and a hold down mechanism preventing the dock platform from pivoting upwardly; wherein the improved hold down mechanism comprises, a hold down bar pivotally connected at one end to the underside of the dock platform with its other end slideably received through a clasp and within a spring under compression against the clasp, the clasp and spring being mounted within a housing that is pivotally connected to the base frame;

a clasp stop bar mounted within the housing on one side of the slide bar and against which the clasp is biased and pivoted by the compressed spring, whereby the clasp contacts the hold down bar at an angle thereby imparting a clamping force on the hold down bar that restricts movement of the hold down bar within the housing.

2. The pit dock leveler of claim 1 and further comprising manual means to release the clamping force on the hold down bar restricting movement of the hold down bar.

3. The pit dock leveler of claim 2 wherein the manual means includes a pull chain mounted to the clasp opposite the clasp stop bar whereby manually pulling the chain pivots the clasp about the clasp stop bar, further compressing the compressed spring, and freeing the clamping force on the hold down bar.

4. The pit dock leveler of claim 1 wherein the clamping force is adjustable so as to overcome a given upward force on the dock platform by selecting tolerances between the hold down bar and the clasp and the compression force of the compressed spring.

5. A pit dock leveler having a base frame secured to a loading dock pit and a dock platform pivotally connected at one of its ends to the base frame and pivotally connected at its opposite end to a dock platform lip that pivots between a downward hanging position when the dock leveler is not in use and an extended position substantially co-planar with the dock platform when the dock leveler is in use, whereby the dock platform lip spans and compensates for the space and height differentials between the loading dock and a transport vehicle, the dock leveler having a counterbalancing mechanism that pivots the dock platform upwardly and a hold down mechanism preventing the dock platform from pivoting upwardly; wherein the improved hold down mechanism comprises, a hold down bar pivotally connected at one end to the underside of the dock platform with its other end slideably received through a clasp assembly, and between clasping bars mounted therein, the clasp assembly being mounted within a clasp housing that is pivotally connected to the base frame;

a control link pivotally mounted between the housing and the clasp assembly to hold the clasping bars in a clasping orientation to the hold down bar, and a release arm fixed to the clasp assembly and having a sufficient length such that its weight pivots the clasp assembly about its pivotal mount to the control link and the clasping bars contact the hold down bar at an angle that imparts a clamping force on the hold down bar and that restricts movement of the hold down bar within the housing.

6. The pit dock leveler of claim 5 and further comprising manual means to release the clamping force on the hold down bar restricting movement of the hold down bar.

7. The pit dock leveler of claim 6 wherein the manual means includes a pull chain mounted to the release arm opposite the clasp assembly whereby manually pulling the chain pivots the clasp assembly about the pivotal connection with the control link, changing the orientation of the clasping bars relative to the hold down bar, and thereby freeing their clamping force on the hold down bar.

8. A pit dock leveler having a base frame secured to a loading dock pit and a dock platform pivotally connected at one of its ends to the base frame and pivotally connected at its opposite end to a dock platform lip that pivots between a downward hanging position when the dock leveler is not in use and an extended position substantially co-planar with the dock platform when the dock leveler is in use, whereby the dock platform lip spans and compensates for the space and height differentials between the loading dock and a transport vehicle, the dock leveler having a counterbalancing mechanism that pivots the dock platform upwardly and a hold down mechanism preventing the dock platform from pivoting upwardly; wherein the improved hold down mechanism comprises, a hold down bar pivotally connected at one end to the underside of the dock platform with its other end slideably received through a clasp assembly, and between clasping bars mounted therein, mounted within a clasp housing that is pivotally connected to the base frame;

a control arm pivotally mounted between the housing and the clasp assembly, with a spring under compression surrounding the control arm between the housing and the clasp assembly, to hold the clasping bars in a clasping orientation to the hold down bar and to bias the clasp assembly away from the control arm, and a release arm fixed to the clasp assembly and having a sufficient length such that its weight pivots the clasp assembly about its pivotal mounting to the control arm and the clasp bars contact the hold down bar at an angle that imparts a clamping force on the hold down bar to restrict movement of the hold down bar within the housing until the movement of the hold down bar through the clamping bars causes the clasp assembly to pivot about its pivotal mounting to the control arm into contact with the housing, and pivots thereafter about the point of contact with the housing, and compressing the spring and releasing the hold down bar from the clamping force of the clamping bars until the control arm spring counters the point of contact pivotal movement and pivots the clasp assembly and the clasping bars into re-engagement with the hold down bar to restrict its movement within the housing.

9. The pit dock leveler of claim 8 and further comprising manual means to release the clamping force on the hold down bar restricting movement of the hold down bar.

10. The pit dock leveler of claim 9 wherein the manual means includes a pull chain mounted to the release arm opposite the clasp assembly whereby manually pulling the chain pivots the clasp assembly about the pivotal connection with the control link.

\* \* \* \* \*

UNITED STATES PATENT AND TRADEMARK OFFICE
CERTIFICATE OF CORRECTION

PATENT NO. : 6,892,411 B1
DATED : May 17, 2005
INVENTOR(S) : Young Z. Yoon and Robert J. Chirico It is certified that error appears in the above-identified patent and that said Letters Patent is hereby corrected as shown below:

Column 8,
Line 61, after "link" please delete "." and insert -- , changing the orientation of the clasping bars relative to the hold down bar, and thereby freeing their clamping force on the hold down bar --.

Signed and Sealed this

Twelfth Day of July, 2005

JON W. DUDAS
*Director of the United States Patent and Trademark Office*